United States Patent [19]

Shishkin

[11] Patent Number: 4,832,843
[45] Date of Patent: May 23, 1989

[54] APPARATUS FOR FILTERING FLUID MEDIUM

[75] Inventor: Viktor V. Shishkin, Krasnodar, U.S.S.R.

[73] Assignee: Inzhenerny Tsentr "Truboprovod", Krasnodar, U.S.S.R.

[21] Appl. No.: 107,597

[22] PCT Filed: Dec. 17, 1986

[86] PCT No.: PCT/SU86/00136
§ 371 Date: Jul. 15, 1987
§ 102(e) Date: Jul. 15, 1987

[87] PCT Pub. No.: WO87/03823
PCT Pub. Date: Jul. 2, 1987

[30] Foreign Application Priority Data

Dec. 24, 1985 [SU] U.S.S.R. ............... 3988608

[51] Int. Cl.$^4$ ............................................. B01D 33/00
[52] U.S. Cl. ................... 210/356; 210/98; 210/111; 210/113; 210/359; 210/398; 210/407; 55/215; 55/299; 55/305; 55/361
[58] Field of Search ............... 210/354, 355, 356, 98, 210/111, 113, 407, 708, 106, 359, 398; 55/213, 215, 361, 380, 298, 299, 304, 305; 209/274, 310

[56] References Cited

U.S. PATENT DOCUMENTS

| 391,328 | 10/1888 | McTighe | 210/98 |
| 3,983,036 | 9/1976 | Lauzeral | 210/356 |
| 4,147,114 | 4/1979 | Holmes | 210/384 |
| 4,155,850 | 5/1979 | Rathbone | 210/98 |
| 4,326,963 | 4/1982 | Watson | 55/96 |
| 4,713,175 | 12/1987 | Bray | 210/356 |

Primary Examiner—Daivd L. Lacey
Assistant Examiner—Thomas M. Lithgow
Attorney, Agent, or Firm—Ladas & Parry

[57] ABSTRACT

The apparatus comprises a hermetically sealed hollow housing (1) accommodating in the interior thereof a flexible filtering member (2) in the form of a hose, the ends of which are turned inside out and attached to the periphery of the inside surface of the housing (1). Cavities (3,4) formed between the hose (2) and housing (1) communicate with a discharge device (8) for discharging the fluid medium being cleaned.

Provided in the interior of the housing between the fixed ends of the hose (2) is a partition wall (9) having a slot-shaped opening (10) for the passage of this hose and dividing the interior of the housing (1) into two chambers (12, 13). Each such chamber (12, 13) is connected to the feeding device (17, 21) for feeding the fluid medium being cleaned and to the evacuation device for evacuating filter cake.

3 Claims, 1 Drawing Sheet

U.S. Patent
May 23, 1989
4,832,843
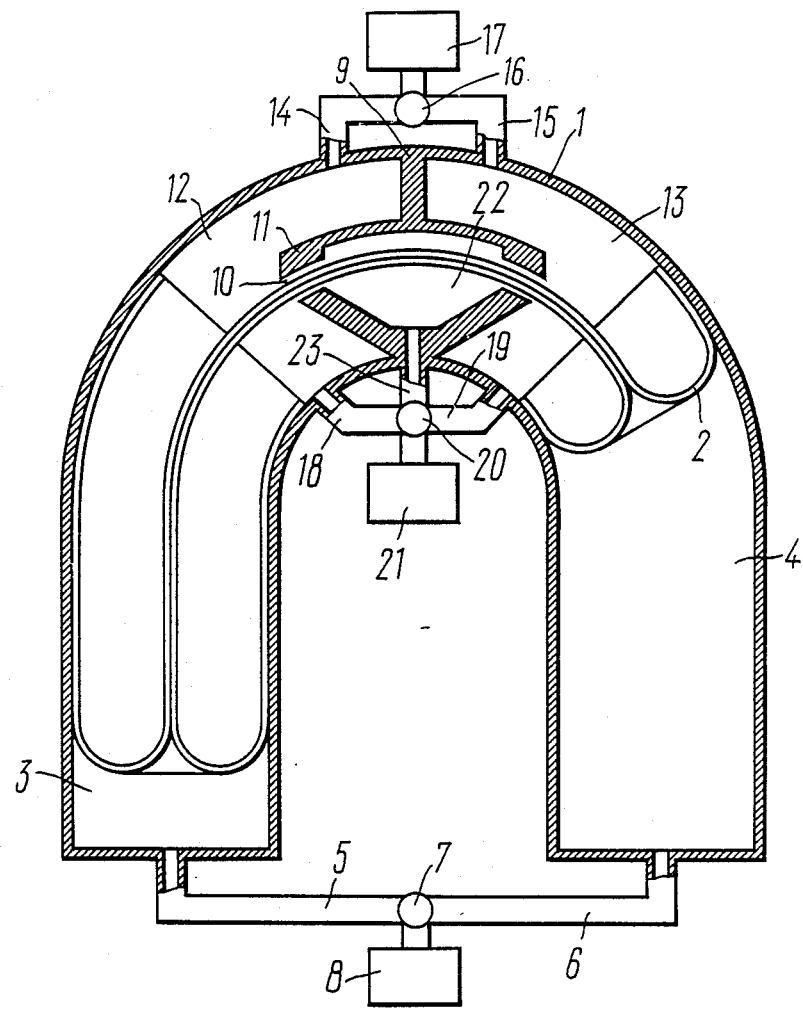

APPARATUS FOR FILTERING FLUID MEDIUM

FIELD OF THE INVENTION

This invention relates to the art of removal of suspended particles and inclusions from fluid media, and more particularly to an apparatus for filtering a fluid medium.

The invention can be used very efficiently for removing solids from chemical products, purifying drinking and circulating water, cleaning industrial effluents from silt and slag, and air dedusting.

The invention can also be used with advantage for removing chemical impurities from liquids and gases, and for drying air and gas.

BACKGROUND OF THE INVENTION

Cleaning liquids and gases from harmful contaminants and solids has become lately a very important aspect of industrial production. However, the present-day filtering systems are either too bulky, or fail to provide sufficient output capacity, or have insufficient pressure sealing during operation, which is especially disadvantageous when filtering harmful or agressive media. So far, no efficient devices are available for cleaning agressive fluid media containing suspended particles, such as devices for cleaning effluents from cattle-breeding farms.

There is known an electromagnetic separator comprising a perforated tray located in a magnetic field and rotated by a drive.

However, this device is disadvantageous because it is structurally overcomplicated.

There is also known an apparatus for filtering liquids comprising a hemetically sealed housing having a slot-shaped opening through which an endless belt of filter cloth is conveyed. The top part of the housing is connected to a means for supplying a liquid to be cleaned, whereas the bottom part thereof is connected to a means for evacuating the clean liquid. The apparatus is further provided with a means for removing cake from the belt of filter cloth (cf., e.g., SU, A No. 79,522).

An inherent disadvantage of this apparatus is its low efficiency. Also, the apparatus is not provided with reliable pressure sealing facilities to result in less efficient operation.

There is further known an apparatus for filtering a fluid medium comprising a hollow housing, a flexible filtering element accommodated inside the housing, and a means for feeding the liquid being cleaned, discharging the clean medium, and evacuating filter cake. (cf., SU, A, No. 98,539).

However, this prior art apparatus is also inherently disadvantageous because periodic cleaning of the filtering elements necessitates termination of the filtration process to result in low efficiency during operation. In addition, the apparatus is insufficiently sealed from the outside, whereby filtering media giving off acrid ordous or agressive media is not possible.

This invention aims at providing an apparatus for filtering a fluid medium, which would be so constructed as to ensure continuous cleaning of the filtering element during operation, while completely separating the medium being cleaned from the outside.

The aims of the invention are attained by that in an apparatus for filtering a fluid media comprising a hollow housing, a flexible filtering member accommodated inside the housing, and means for feeding the fluid to be cleaned, discharging the clean medium, and evacuating filter cake, according to the invention, the housing is hermetically sealed, whereas the filtering member is fashioned as a hose ends of which are turned inside out to be attached to the periphery of the inside surface of the housing to define therewith cavities each communicating with the means for discharging the clean medium, a partition wall having an opening being arranged between the ends of the hose for ensuring the passage of the hose therethrough, this partition wall dividing the interior of the housing occupied by the hose into two chambers each communicating with the respective means for feeding the medium to be cleaned and evacuating the filter cake.

The present invention makes it possible to substantially increase the filtration efficiency.

Such an increase has been attained by that used as a filtering member is the aforementioned flexible hose movable through the hole in the partition wall to be continuously cleaned from the filter cake in the course of operation of the proposed apparatus.

Quality of filtering is improved by that the cake is continuously removed from the filtering member. Hermetic sealing of the apparatus is ensured by that the filtering member is accommodated inside the housing.

In a preferred embodiment of the present invention the partition wall has in the area of the hole arcuate scrapers arranged with a clearance relative to each other, their concavities facing each other.

Such an arrangement provides heigher efficiency of operation and improved cleaning of the filtering member, since the jets of washing liquid, while entering the cavity formed by the scrapers, act to additionally wash dirt off the surface of the filtering element. In addition, the provision of a space between the scrapers ensures concentration of the cake being removed and continuous evacuation of the cake from the apparatus. This in turn provides a higher quality of filtering due to that the cake fails to get back to the filtration zone.

BRIEF DESCRIPTION OF THE DRAWINGS

Other objects and attending advantages of the present invention will become more fully apparatus from a detailed description of a specific embodiment thereof taken in conjunction with the accompanying drawings the sole FIGURE of which shows a schematic diagram of the apparatus for filtering a fluid medium.

BEST MODE OF CARRYING OUT THE INVENTION

The apparatus comprises a hollow hermetically sealed housing 1 the interior of which accommodates a flexible filtering hose member 2 the ends of which are turned inside out, secured about the periphery of the inner surface of the housing 1, and form jointly with the housing 1 cavities 3 and 4 communicating by way of pipes 5 and 6 through a valve 7 with a means 8 for removing the clean fluid medium.

A partition wall 9 with a slot-shaped hole 10 for receiving the hose 2 is provided in the central zone of the housing 1 between the fixed ends of the hose 2. The hole 10 is defined by two arcuate scrapers 11 affixed to the partition wall 9 with a clearance relative to each other and with concavities facing each other. The partition wall 9 separates the interior of the housing 1 occupied by the hose 2 into two chambers 12 and 13 each one of which is connected by pipes 14, 15 through a valve 16 to a means for feeding the fluid medium to be cleaned, and by pipes 18, 19 through a valve 20 to a means 21 for evacuating filter cake. A cavity 22 between the scrapers 11 also communicates by a pipe 23 through the valve 20 with the means 21 for evacuating filter cake.

The proposed apparatus operates in the following manner.

The valve 16 opens, and a fluid medium to be cleaned is admitted by the means 17 through one of the pipes 14 or 15 to one of the chambers 12, 13, such as chamber 12, to flow through hose 2 to the cavity 3, wherefrom this medium is forced through the open valve 7 by the means 8 and via the pipe 5 to a tank (not shown). As cake builds up at the surface of the hose 2, resistance to filtration grows, and the hose 2 is moved to the cavity 3 thereby feeding the clean surface of the hose 2 to the filtration zone. Therewith, the hose 2 is admitted through the hole 10 in the partition wall 9 to the cavity 3 from the cavity 4. While being moved through the scrapers 11, filter cake (if present) is removed from the hose 2. The hose 2 is additionally cleaned by that part of the flow of the medium being cleaned tends to enter through the hole 10 from the chambers 12, 13 to the cavity 22. During the movement of the hose 2 from the cavity 4 to the cavity 3 a vacuum is produced in the cavity 4, which acts to envigorate the process of cleaning the fluid medium. The thus removed filter cake accumulates mostly inside the cavity 22 between the scrapers 11, as well as on the inside surface of the housing 1 close to the partition 9, after which the cake is evacuated through the pipes 18, 19, 23 and valve 20 by the means 21 for storage in a tank (not shown).

After the hose 2 travels to the end face of the housing 1, the valve 16 switches over and the fluid medium being cleared is admitted through the pipe 15 to the chamber 13. The hose 2 starts to travel from the cavity 3 to the cavity 4. As soon as the hose 2 travels to the opposite end of the housing 1, the operating cycle is repeated.

The travel of the hose 2 is caused by the pressure difference in the chambers 12 and 13. The magnitude of this pressure difference is determined by the amount of fluid medium fed to the chambers 12 and 13.

INDUSTRIAL APPLICABILITY

The invention can be used for cleaning water, chemical solutions, industrial waste water, and gases.

I claim:

1. An apparatus for filtering a fluid medium comprising:
    a hollow housing having a feeding means that is connectable to a system for supplying fluid to be filtered, said housing having an interior surface;
    a flexible filtering element, having an open ended substantially cylindrical shape and having both of its ends turned inside out and fixed to the interior surface of said housing so as to define two filtrate cavities in said housing on either side of the two fixed ends opposite the feed cavity that receive the fluid filtered by a feed cavity between the fixed ends and the filtering element, said feeding means being connected in flow communication with said feed cavity;
    a partition wall attached to said interior surface between said two fixed ends so as to define at least two chamber in said feed cavity, said wall having at least one slot through which the portion of the filter element in said feed cavity extends through;
    a means for discharging the filtered fluid from said filtrate cavities; and
    means, communicating with said chambers, for removing the precipitate formed on said filtering element.

2. Apparatus according to claim 1, wherein the hollow housing is hermetically sealed.

3. Apparatus according to claim 2, wherein said means for removing comprises at least one scraper attached to a portion of said slot so as to physically remove precipitate from the filtering element.

* * * * *